United States Patent [19]

Shields

[11] 4,345,663
[45] Aug. 24, 1982

[54] SPEED GOVERNOR WITH DUAL SAFETY SYSTEM

[75] Inventor: Neal G. Shields, Fort Worth, Tex.

[73] Assignee: Specific Cruise Systems, Inc., Fort Worth, Tex.

[21] Appl. No.: 170,112

[22] Filed: Jul. 18, 1980

[51] Int. Cl.³ .............................................. B60K 31/00
[52] U.S. Cl. .................................... 180/177; 123/350; 123/360; 180/179
[58] Field of Search ............... 180/177, 176, 175, 178, 180/179; 123/360, 352, 349, 350, 351, 361

[56] References Cited

U.S. PATENT DOCUMENTS

| | | | |
|---|---|---|---|
| 3,381,771 | 5/1968 | Granger et al. | 180/176 |
| 3,455,411 | 7/1969 | Carp et al. | 180/176 |
| 3,648,798 | 3/1972 | Jania | 123/360 |
| 3,722,614 | 3/1973 | Sakakibara et al. | 180/176 |
| 3,727,714 | 4/1973 | Ishikawa | 180/178 X |
| 3,752,252 | 8/1973 | Sakakibara | 180/176 |
| 3,946,707 | 3/1976 | Gray | 180/176 X |
| 4,084,659 | 4/1978 | Abend et al. | 180/179 |
| 4,158,192 | 6/1979 | Muto | 180/177 X |
| 4,215,760 | 8/1980 | Sakakibara et al. | 180/176 |

*Primary Examiner*—Richard A. Bertsch
*Assistant Examiner*—Milton L. Smith

*Attorney, Agent, or Firm*—James E. Bradley

[57] ABSTRACT

A motor vehicle speed governor has safety features to assure that the throttle is released when the brake pedal is depressed even if malfunctions occur in certain components of the system. The speed governor has a servo for moving the throttle, an accelerator device for causing the servo to advance the throttle, a decelerator device for releasing the throttle, a control circuit for controlling the accelerator and decelerator devices in response to vehicle speed, and a power circuit that energizes the control circuit. The power circuit is connected into the brake electrical line. It includes a latching device that is powered through the ignition switch, but will latch and conduct only when energized by a set/on switch. The set/on switch requires power in the brake line across the brake fuse. The resume switch also requires power from the brake line across the brake fuse. A brake switch in the brake line is closed by depressing the brake pedal, sending a signal to the control circuit to release the throttle. A backup safety system is powered by the power circuit, but grounded through the brake light. It includes a safety release device that releases the throttle when a safety switch is opened by the depressing of the brake pedal.

10 Claims, 2 Drawing Figures

SPEED GOVERNOR WITH DUAL SAFETY SYSTEM

BACKGROUND OF THE INVENTION

This invention relates in general to speed governors for motor vehicles, and particularly to improvements in the safety system to assure that the governor releases when the brakes are actuated.

Many motor vehicles are equipped with speed governors, known as "cruise controls". The cruise control enables the driver to select a speed, which will then be automatically maintained by the control system. The system normally has a servo that opens and controls the throttle and a control means for sensing and controlling the speed. The control means can either hold the speed, or it can actuate an accelerator means to advance the throttle or a decelerator means to allow the throttle to retract. Normally the accelerator means is a valve that provides vacuum to a vacuum servo. The decelerator means is a valve that relieves the vacuum in the vacuum servo. Also, a brake switch is provided for signalling the control circuit to decelerate when the brake pedal is depressed.

Some systems have a second switch or safety release means that also will cause the throttle to retract when the brake pedal is depressed. The second system is an added safety feature that is needed in case either the brake switch, the accelerator means, or the control circuit fails. If a component of the safety circuit fails, in addition to a component in the main release circuit, then the throttle may not release, possibly causing an accident.

SUMMARY OF THE INVENTION

It is accordingly a general object of this invention to provide an improved motor vehicle speed governor.

It is a further object of this invention to provide an improved safety system for a motor vehicle speed governor that assures release of the throttle should the brake pedal be depressed.

It is a further object of this invention to provide an improved safety system for a motor vehicle speed governor that releases the throttle even if certain components in the main release system and the safety system fail.

In accordance with these objects, a safety system for a speed governor is provided. The speed governor is of the type having a servo that moves the throttle, an acceleration device for causing the servo to advance the throttle, a deceleration device that releases the throttle, a control circuit for controlling the accelerator and decelerator devices, and a power circuit that energizes the control circuit. A brake switch is connected into a brake electrical line that extends between the brake fuse and the brake light. The brake switch signals the control means to release the throttle when the brake pedal is depressed. In addition to the brake switch, a safety release device releases the throttle independent of the positions of the accelerator and decelerator devices. The safety device is connected into a safety electrical line that extends from the power circuit to a point in the brake electrical line between the brake switch and the brake light. A safety switch is connected into the safety line for opening the safety line to cause the safety device to release the throttle when the brake pedal is depressed.

The power circuit has a SET/ON switch that is connected into the brake line. A latching switch in the power circuit is connected into the ignition switch. The SET/ON switch initiates the latching switch to conduct and sustain current flow for powering the control circuit.

The safety device provides a backup safety feature that operates independent of the control circuit. By connecting the safety device back into the brake light line, and connecting the main release and power system into the brake light line, the safety device can be actuated even if its switch fails. Also, connecting the power circuitry into the brake light line causes it to be impossible to turn the cruise control on if the brake fuse fails.

DESCRIPTION OF THE PREFERRED EMBODIMENT

Figure 1:
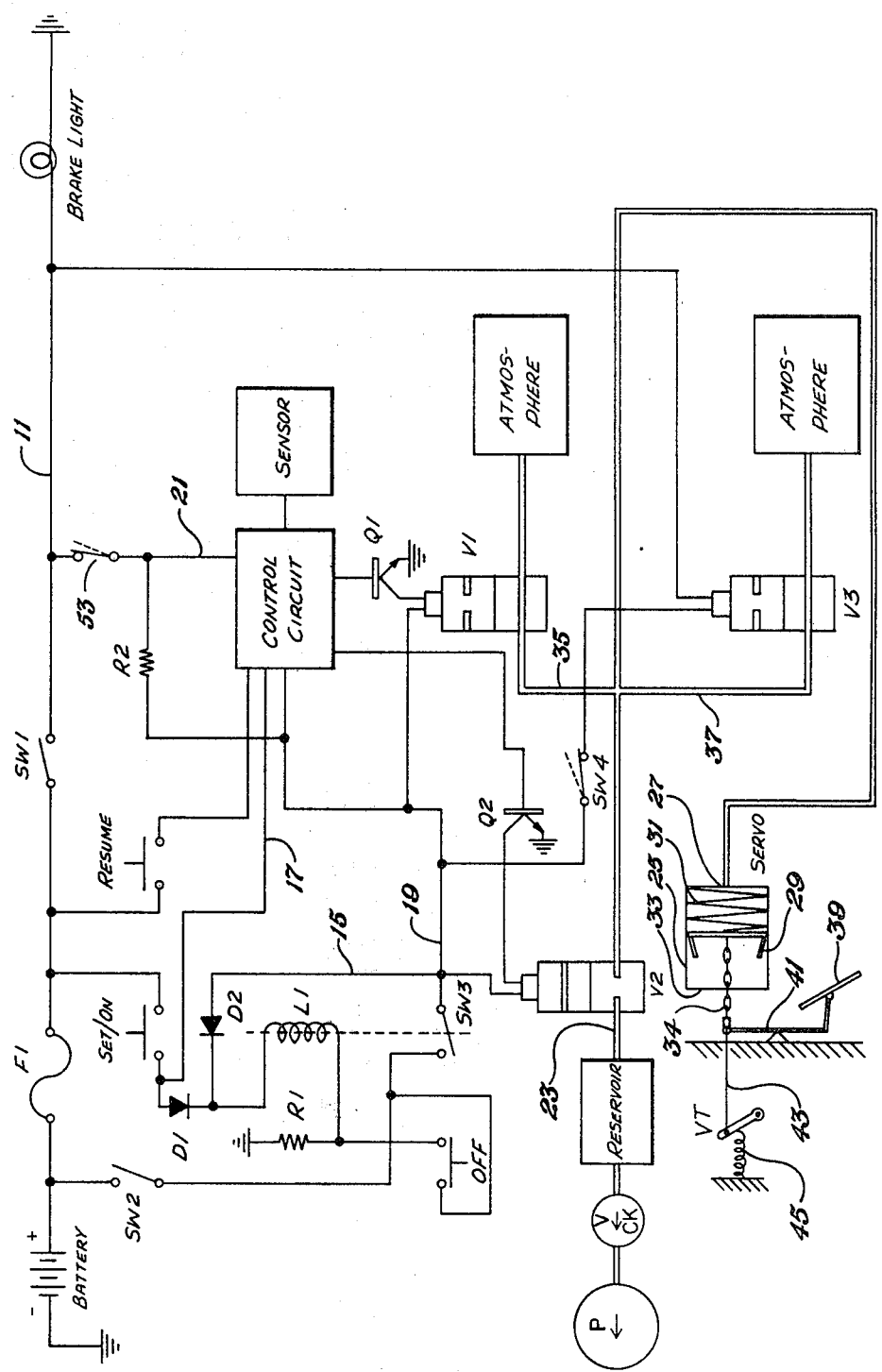
FIG. 1 is a schematic illustrating a speed governor constructed in accordance with this invention.

Referring to FIG. 1, the motor vehicle will have a brake line, wire or conductor 11 connected between a ground and the battery. A brake light and a brake fuse F1 are connected into brake line 11. Fuse F1 will open the circuit should the current in brake line 11 exceed a selected amount. A switch SW1 is interconnected into the brake line 11 and mounted in the passenger compartment so that it will close when the brake pedal 13 (FIG. 2) is pressed. This causes the brake line 11 to conduct, energizing the brake light.

The motor vehicle has an ignition switch SW2 that has one side connected to the battery. The opposite side of the ignition switch SW2 is connected to a relay switch SW3. A SET/ON switch, of a type that is normally off, and actuates momentarily by depressing, has one side connected to the brake line 11 between brake fuse F1 and brake switch SW1. The other side is connected to the anode of a diode D1, whose cathode is connected to an inductor or relay L1. Relay L1 moves relay switch SW3 to a closed position when conducting. The opposite side of relay L1 is connected through a resistor R1 to ground. Relay switch SW3 is connected to an energizing circuit or line 15 that extends to the anode of a diode D2. The cathode of diode D2 is connected to the cathode of diode D1.

When relay switch SW3 is closed by relay L1, and the ignition switch SW2 is closed, current flows through the energizing circuit 15, relay L1, and resistor R1 to ground. This serves as the power means for the electronic control circuit. Relay switch SW3 is closed by momentarily depressing the SET/ON switch, which causes current to flow through brake fuse F1, relay L1, and resistor R1 to ground. Once switch SW3 is closed, it will remain closed, due to the current that it causes to flow through the relay L1, even though the SET/ON switch has moved back to the off position. Consequently, the relay L1 and relay switch SW3 serve as latching means for sustaining current flow in energizing line 15, when initiated by the momentary closing of the SET/ON switch.

An OFF switch of the type that is normally open, and closes by depressing, has one side connected to the line between resistor R1 and relay L1. The other side of the OFF switch is connected between ignition switch SW2 and relay switch SW3. If relay switch SW3 is closed, causing a voltage potential in the energizing line 15, depressing the OFF switch will cause the relay switch SW3 to open, since current through the battery will flow directly to resistor R1 through the OFF switch, bypassing relay L1 and causing relay switch SW3 to open.

The control circuit is a conventional electronic circuit that senses speed and provides a signal either to increase, to decrease, or to hold the speed in response thereto. The control circuit is an integrated circuit, and the preferred type is a Motorola circuit no. 14460. The sensor may be of various types, connected into the transmission, or the speedometer cable, for counting pulses received due to rotation of a member as the vehicle rolls. The control circuit has one line 17 connected between the control circuit and a point between the SET/ON switch and diode D1. This line causes the control circuit to set the speed when the SET/ON switch is depressed. A second line 19 is connected between the control circuit and the energizing line 15, providing power to the control circuit. The control circuit has a third line 21 connected between it and the brake line 11. Line 21 provides the means for receiving a signal when the brake switch SW1 is closed. A resistor R2 is connected between lines 19 and 21, bypassing the control circuit. A RESUME switch is connected between the control circuit and a point in brake line 11 between fuse F1 and brake switch SW1. The RESUME switch is normally off or open.

The control circuit has an output line that is connected to the base of a transistor Q1. The emitter of transistor Q1 is connected to ground, while the collector of transistor Q1 is connected to a solenoid actuated vent valve V1. The other side of the solenoid of vent valve V1 is connected into line 19. If the control circuit provides a signal to transistor Q1, the transistor Q1 will complete its circuit to ground, actuating the vent valve V1 from its normally open position shown in FIG. 1 to a closed position (not shown).

The control circuit has another output line that is connected to the base of a transistor Q2. The emitter of transistor Q2 is connected to ground while the collector is connected to a solenoid actuated vacuum valve V2. The other side of the solenoid of the vacuum valve V2 is connected to line 19. If the control circuit provides a signal to transistor Q2, it will conduct, providing a ground for the solenoid of V2, causing the valve to move from its normally closed position, shown in FIG. 1, to an open position (not shown).

A safety valve V3 is also solenoid actuated, having one side connected into a safety line extending to line 19. A normally closed safety switch SW4 is interconnected into the safety line. Safety switch SW4 is positioned so as to open when the brake pedal 13 is depressed. The other side of the solenoid of the safety valve V3 is connected to brake line 11, between brake switch SW1 and the brake light. Grounding is provided through the brake light. Thus if a voltage potential exists in line 19, and the brake pedal 13 is not depressed, safety valve V3 will move from the normally open position, shown in FIG. 1, to a closed position (not shown).

The vacuum system of the preferred embodiment includes a source of vacuum, labeled P, which is the engine manifold. A reservoir is mounted in a vacuum conduit 23 extending from the manifold P. A check valve is mounted between the manifold P and reservoir to prevent the flow of air if the pressure in manifold P is higher than in the reservoir. The vacuum valve V2 is a two position valve that selectively opens and closes conduit 23. Vacuum valve V2 is located in the engine compartment between the reservoir and a servo.

Figure 2:
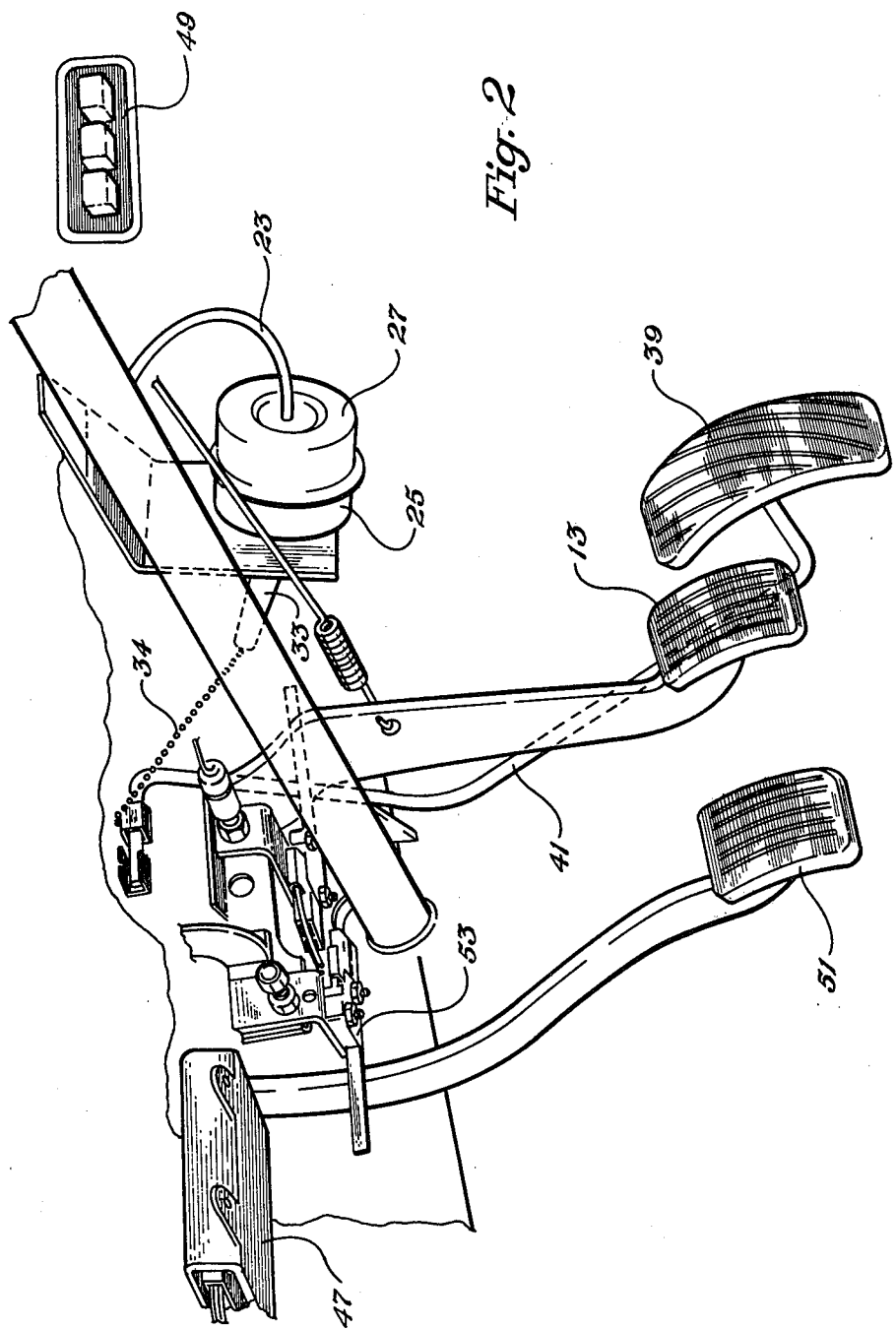
FIG. 2 is a perspective view of the portions of the speed governor of FIG. 1 that are located in the passenger compartment below the dashboard.

The servo, however, is located in the passenger compartment below the dashboard, as indicated in FIG. 2. The servo includes a chamber or housing 25 having a rearward end 27 connected to the vacuum conduit 23. A piston 29 is reciprocally carried in the chamber 25. A coil spring 31 urges the piston toward the forward end 33 of the chamber 25. The directions "foward" and "rearward" refer to normal driving directions. A servo linkage comprising a flexible chain 34 is connected to the forward end of the piston 29 and extends through an aperture provided in the forward wall 33 to the rearward end of the carburetor throttle cable 43. The carburetor throttle is indicated symbolically as VT, and is biased forwardly to the idle position by a spring 45. Placing vacuum valve V2 in the energized, open position, provides the vacuum in chamber 25, drawing piston 29 rearwardly, and opening throttle VT. Closing vacuum valve V2 causes the vacuum in the chamber 25 to hold, stopping any movement of the piston 29.

Vent valve V1 is also a two position valve. It is connected to a conduit 35 that connects with conduit 23 between the vacuum valve V2 and the servo. Vent valve V1 is mounted in the engine compartment, and has its opposite side leading to atmosphere. If in the open position, as shown in FIG. 1, vent valve V1 will prevent any vacuum from existing in the chamber 25 of the servo since it will communicate the chamber to atmosphere. If in the closed position, vent valve V1 will allow vacuum to exist in the servo.

Safety valve V3 is also a two position valve that is normally open to atmosphere and is located in the engine compartment. Safety valve V3 is connected to a conduit 37 that extends into the conduit 23 between the vacuum valve V2 and the servo. If in the open position, as shown, the safety valve V3 will prevent any vacuum from existing in the servo, regardless of the position of the vent valve V1, since it will communicate the servo to atmosphere. If in the closed position, it will allow vacuum to exist in the servo.

Referring also to FIG. 2, the accelerator pedal 39 includes a rod 41 that extends to the rearward end of the throttle linkage member or cable 43 (FIG. 1). Throttle linkage 43 may either be a flexible cable or it may be a rigid rod. In either case, under normal driving operation, when the driver presses the accelerator pedal 39 downwardly and forwardly, the pedal pulls on the rearward end of throttle cable 43, opening the carburetor throttle VT. The servo linkage 34 is connected directly between the top of rod 41 at the rearward end of throttle cable 43, and the servo piston 29. Consequently, when the piston 29 moves rearwardly, the servo linkage 34 draws the throttle linkage 43 rearwardly. This pulls accelerator pedal 39 downward, and opens throttle VT. Spring 45 (FIG. 1) urges accelerator pedal 39 rearwardly and upwardly when the throttle VT is released.

A housing 47, shown in FIG. 2, is mounted to the motor vehicle in the passenger compartment, for containing the control circuit, and associated electrical and electronic equipment for the speed governor. A set 49 of three buttons or keys is mounted in the passenger compartment for selectively actuating the OFF, SET/ON and RESUME switches. A clutch pedal 51 is shown in FIG. 2, although the system operates with motor vehicles that do not have clutch pedals. If a clutch pedal 51 is in the motor vehicle, a clutch switch 53 is mounted in series in line 21 (FIG. 1) and is normally closed. When the clutch is depressed, it opens causing resistor R2 to cause positive current to flow to the control circuit through line 21. This causes the cruise control to shut off.

In operation, the speed governor is actuated as the vehicle is moving, and with the ignition switch SW2 closed. The SET/ON switch is depressed when the vehicle is at the desired speed. This signals the control circuit and energizes the relay L1, closing relay switch SW3. Current will then flow through the energizing line 15, relay L1, and resistor R1 to ground. The SET/ON switch will spring back to the off position shown in FIG. 1. Power to the control circuit will be provided through line 19.

The control circuit will sense the speed through the sensor. If the speed drops from the time when the SET/ON switch was depressed, a signal will be provided from the control circuit to transistor Q2. This allows the valve V2 to open, creating vacuum in conduit 23. At the same time, the control circuit signals transistor Q1 to close the vent valve V1. Also the safety valve V3 will have moved to the closed position, since current will be flowing through the safety switch SW4. With both the vent valve V1 and safety valve V3 closed, vacuum will be drawn in the chamber 25, moving piston 29 rearwardly, and advancing the throttle VT through the servo linkage 34.

At the desired speed, the control circuit will signal the valve V2 to close while maintaining the vent valve V1 closed, holding the piston 29 at a particular position. If the speed begins to exceed the set speed, such as when traveling down a hill, the control circuit will signal transistor Q1 to turn off, causing the vent valve V1 to spring back to its normally open position, relieving the vacuum in the chamber 25. Consequently, the vacuum valve V2 serves as an acceleration means for advancing the throttle while the vent valve V1 serves as deceleration means for allowing the throttle to retract.

If the brake pedal is depressed, brake switch SW1 will close. This enables current to flow through fuse F1 and through the brake light to ground. The voltage potential at line 21 thus equals the voltage potential of line 19, signalling the control circuit to turn off transistors Q1 and Q2. This enables the vent valve V1 to open and the vacuum valve V2 to close, causing the servo to allow the throttle to retract to the idle position. At the same time, and independently of brake switch SW1, safety switch SW4 will open due to the movement of the brake pedal 13. This breaks the circuit through the safety valve V3, causing it to shift back to its normally open position, also exposing the vacuum of the servo to atmosphere. The relay switch SW3 remains closed and is unaffected by movement of the brake pedal 13.

When the brake pedal 13 is released, the safety switch SW4 will again close and the brake switch SW1 will again open. This allows current to flow through the solenoid of the safety valve V3, shifting it to its closed position. The control circuit will not provide current to transistors Q1 and Q2 to accelerate, however, until the RESUME switch is depressed, providing voltage through the brake line 11 to the control circuit. Once depressed, the control circuit will resume its control of the vent valve V1 and vacuum valve V2. To turn off the system, the OFF switch is depressed, causing current to cease flowing through the relay L1, and opening the relay switch SW3. To reactuate the control circuit, the SET/ON switch must again be pushed.

Should the brake fuse F1 be open before the SET/ON switch is depressed, the power means cannot be actuated to energize the control circuit, since potential must exist on the opposite side of the brake fuse F1 for the SET/ON switch. If the brake fuse F1 fails while the vehicle is travelling and the switch SW3 has been previously closed by the SET/ON switch, there will be no affect on the relay switch SW3. It will remain closed. It is expected, however, that the brake fuse F1 would open only when conducting, with the brake switch SW1 closed. When conducting, a de-energizing signal is provided to the control circuit. Consequently, the vent valve V1 would be signalled to open to its atmosphere position even if the brake fuse is in the process of opening due to excessive current. It would be impossible to reactuate the control circuit, since the RESUME switch requires a potential, and a working brake fuse F1.

If the brake switch SW1 failed to close when the brake pedal 13 is actuated, venting would still be provided through the safety valve V3, assuming that safety switch SW4 opened, as required. If the brake switch SW1 closed on depression, as required, but the vent valve V1 failed to close and the safety switch SW4 failed to open, venting would still be provided through the safety valve V3. Closure of the brake switch SW1 while the safety switch SW4 is still closed, places the same potential on both sides of the safety valve V3, thus causing the safety valve V3 to move to its normally open position.

The invention has significant advantages. The dual safety system makes it highly unlikely for a failure to occur of the type that fails to release the throttle when the brake pedal is depressed. Connecting the circuitry into the brake light line assures that the control circuit will not initiate control unless the brake light line is in working order. Even if a failure occurs after initiation, while the vehicle is travelling, deactivation will occur and the system cannot be reinitiated to control the speed until the defect is repaired. Making the safety switch independent of the control circuit causes a release of the throttle even if the main release system fails. Even if the main release fails, and the safety switch fails, the safety release device will release the throttle so long as the brake switch actuates. Consequently, a failure in the main release system will not affect the safety system. However, the safety system is interconnected with the main release system to the extent that the main release system can cause the safety system to release, even if failures to a certain extent occur in both systems.

While the invention has been shown in only one of its forms, it should be apparent to those skilled in the art that it is not so limited, but is susceptible to various changes and modifications without departing from the spirit of the invention. For example, instead of a vacuum system, an electrical motor could control the throttle, with the accelerator and decelerator means being driver transistors. The safety release could be an electrically actuated clutch on the drive motor.

I claim:

1. In a motor vehicle speed governor of the type having servo means for moving the throttle, accelerator means for causing the servo means to advance the throttle, decelerator means for causing the servo means to release the throttle, control means for controlling the accelerator means and decelerator means in response to vehicle speed, and power means for energizing the control means, the improvement comprising:

brake switch means, connected into a brake line extending between a brake fuse and a brake light, for signalling the control means to actuate the decelerator means when a brake pedal is depressed;

safety means for causing the servo means to release the throttle independent of the positions of the accelerator means and decelerator means, the safety means being connected into a safety line that extends from the power means to a point in the brake line between the brake switch means and the brake light; and safety switch means connected in the safety line for opening the safety line when the brake pedal is depressed to cause the safety means to release the throttle.

2. The speed governor according to claim 1 wherein the brake switch means closes the brake line when the pedal is depressed.

3. The speed governor according to claim 1 wherein the power means comprises:

a normally open set/on switch having one side connected to the brake line between the brake fuse and the brake switch means; and latching switch means, connected to another side of the set/on switch, having one side connected to an ignition switch and another side to ground, for completing and sustaining current in an energizing line to ground when initiated by momentary closing of the set/on switch, the control means and the safety line being connected to the energizing line.

4. In a motor vehicle speed governor of the type having servo means for moving the throttle, accelerator means for causing the servo means to advance the throttle, decelerator means for causing the servo means to release the throttle, control means for controlling the accelerator means and decelerator means in response to vehicle speed, and power means for energizing the control means, the improvement comprising:

brake switch means, connected into a brake line extending between a brake fuse and a brake light, for closing the brake line and signalling the control means to actuate the decelerator means to release the throttle when a brake pedal is depressed;

a normally open set/on switch having one side connected to the brake line between the brake fuse and the brake switch means;

latching means, connected to another side of the set/on switch, having one side connected to an ignition switch and another side to ground, for completing and sustaining current in an energizing line to ground when initiated by momentary closing of the set/on switch, the control means being connected to the energizing line; and a resume switch connected between the control means and a point in the brake line between the brake fuse and the brake switch means, for signalling the control means to resume control of the vehicle speed after the brake pedal has been depressed and released.

5. The speed governor according to claim 3 wherein the latching switch means comprises:

a relay having one side in communication with ground and another side connected to the set/on switch for conducting when the set/on switch is depressed; and a relay switch, having one side connected to the ignition switch and another side connected between the relay and the set/on switch, the relay having means for closing the relay switch to complete the energizing circuit to ground through the relay when the relay conducts by depressing the set/on switch.

6. In a motor vehicle speed governor of the type having servo means for moving the throttle in response to a vacuum input, vacuum valve means connected to a source of vacuum for providing vacuum to the servo means, vent valve means for relieving vacuum in the servo means, control means for controlling the vacuum valve and vent valve means in response to the vehicle speed, and power means for energizing the control means, the improvement comprising:

brake switch means, connected into a brake line extending between a brake fuse and a brake light, for signalling the control means to actuate the vent valve means when a brake pedal is depressed;

safety valve means for relieving vacuum in the servo means independent of the vent valve means, connected to a safety line extending from the power means to a point in the brake line between the brake switch means and the brake light; and safety switch means connected into the safety line for opening the safety line to cause the safety valve means to relieve vacuum when the brake pedal is depressed.

7. The speed governor according to claim 6 wherein the power means comprises:

a normally open set/on switch having one side connected to the brake light between the brake fuse and the brake switch means; and latching switch means connected to another side of the set/on switch, having one side connected to an ignition switch and another side to ground, for completing and sustaining current in an energizing line to the ground when initiated by momentary closing of the set/on switch, the control means and the safety line being connected to the energizing line.

8. The speed governor according to claim 7 wherein the latching switch means comprises:

a relay having one side in communication with ground and another side connected to the set/on switch for conducting when the set/on switch is depressed, and a relay switch having one side connected to the ignition switch and another side connected between the relay and the set/on switch, the relay having means for causing the relay switch to complete the energizing line to ground through the relay when the relay conducts by depressing the set/on switch.

9. A speed governor of the type having servo means for moving the throttle in response to a vacuum input, vacuum valve means connected to a source of vacuum for providing vacuum to the servo means, vent valve means for relieving vacuum in the servo means, control means for controlling the vacuum valve means and vent valve means in response to the vehicle speed, the improvement comprising:

brake switch means, connected into a brake line extending between a brake fuse and a brake light for causing the brake line to conduct and for signalling the control means to actuate the vent valve means when a brake pedal is depressed;

a normally open set/on switch having one side connected to the brake line between the brake fuse and the brake switch means;

a relay having one side in communication with ground and another side connected to the set/on switch for conducting when the set/on switch is depressed;

a relay switch having one side connected to an ignition switch and another side connected between the relay and the set/on switch, the relay having means for closing the relay switch to complete and sustain current in an energizing line through the relay when the relay conducts by depressing the set/on switch; and a resume switch connected between the control means at a point in the brake line between the brake fuse and the brake switch means, for signalling the control means to resume control of the vehicle's speed.

10. A speed governor of the type having servo means for moving the throttle in response to a vacuum input, vacuum valve means connected to a source of vacuum for providing vacuum to the servo means, vent valve means for relieving vacuum in the servo means, control means for controlling the vacuum valve means and vent valve means in response to the vehicle speed, the improvement comprising:

brake switch means, connected into a brake line extending between a brake fuse and a brake light for causing the brake line to conduct and for signalling the control means to actuate the vent valve means when a brake pedal is depressed;

a normally open set/on switch having one side connected to the brake line between the brake fuse and the brake switch means;

a relay having one side in communication with ground and another side connected to the other side of the set/on switch for conducting when the set/on switch is depressed;

a relay switch having one side connected to an ignition switch and another side connected between the relay and the set/on switch, the relay having means for closing the relay switch to complete and sustain current in an energizing line through the relay when the relay conducts by depressing the set/on switch;

a resume switch connected between the control means at a point in the brake line between the brake fuse and the brake switch means, for signalling the control means to resume control of the vehicle's speed;

a safety valve means for relieving vacuum in the servo means independently of the vent valve means, connected to a safety line extending from the power means to a point in the brake line between the brake switch means and the brake light; and safety switch means connected into the safety line for opening the safety line to cause the safety valve means to relieve vacuum when the brake pedal is depressed.

* * * * *